United States Patent Office 3,755,360
Patented Aug. 28, 1973

3,755,360
2,3,4,5-TETRAHYDRO-7H-[1,3]DIAZEPINO-
[2,1-a]ISOINDOLES
William J. Houlihan, Mountain Lakes, N.J., assignor to
Sandoz-Wander, Inc., Hanover, N.J.
No Drawing. Filed Mar. 23, 1967, Ser. No. 625,296
Int. Cl. C07d 57/02
U.S. Cl. 260—326.5 B                    7 Claims

ABSTRACT OF THE DISCLOSURE

The compounds are of the class of 7-hydroxy-7-aryl-2,3,4,5-tetrahydro - 7H - [1,3]diazepino[2,1-a]isoindoles which are useful as anorectic agents and are prepared by isomerization of the corresponding 11b-aryl-1,2,3,4,5,11b-hexahydro-7H-[1,3]diazepino[2,1-a]isoindol-7-ones.

---

This invention relates to tricyclic compounds. In particular, the invention pertains to 7-hydroxy-7-aryl-2,3,4,5-tetrahydro - 7H - [1,3]diazepino[2,1-a]isoindoles and a process for preparing the same.

The isoindoles of the present invention may be represented structurally as follows:

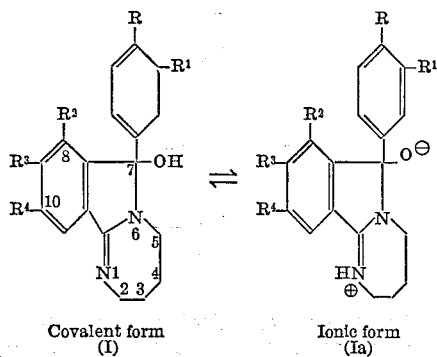

Covalent form (I)      Ionic form (Ia)

wherein each of R and $R^1$ is, independently, hydrogen; chloro; fluoro; straight-chain(lower)alkyl, preferably containing from 1 to 4 carbon atoms, i.e. methyl, ethyl, propyl or butyl; straight-chain(lower)alkoxy, preferably containing from 1 to 4 carbon atoms, i.e., methoxy, ethoxy, propoxy, or butoxy; or trifluoromethyl; and each of $R^2$, $R^3$ and $R^4$ is, independently, hydrogen; or chloro; provided that at least one of $R^2$, $R^3$ and $R^4$ is hydrogen; and provided further that at most three of R, $R^1$, $R^2$, $R^3$ and $R^4$ are other than hydrogen.

The above compounds (I) are prepared by isomerizing an 11b-aryl - 1,2,3,4,5,11b-hexahydro-7H-[1,3-diazepino-[2,1-a]isoindol-7-one by treating the latter with lithium aluminum hydride as illustrated by the following reaction scheme:

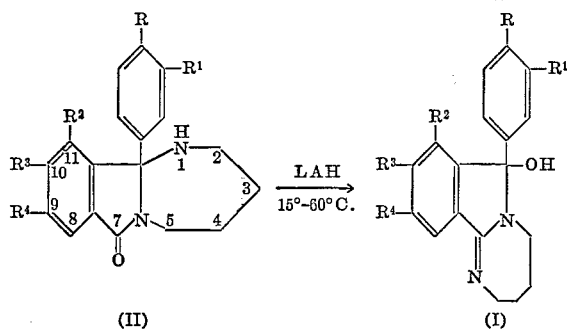

wherein R, $R^1$, $R^2$, $R^3$ and $R^4$ are as defined above.

The isomerization is carried out in an inert ether solvent, preferably diethyl ether or tetrahydrofuran, employing lithium aluminum hydride as the isomerizing agent. The temperature at which the reaction is effected is critical and should not exceed about 60° C. Preferably, the reaction is carried out at a temperature of from about 15° C. to about 35° C.

Various of the starting compounds (II) employed in the above process and their preparation have been described in the literature (see, e.g., Netherlands Pat. No. 6501647, published Aug. 12, 1965). Such others which are not specifically described in the literature can be prepared in analogous manner.

The compounds of Formula I are useful because they possess pharmacological activity in animals. In particular, the compounds possess both appetite depressant activity and mild central nervous system stimulant activity and accordingly can be used as anorexigenic agents and mild psychic energizers. For such uses, the compounds may be combined with a pharmaceutically acceptable carrier, and such other adjuvants as may be necessary, and administered orally in such forms as tablets, capsules, elixirs, suspensions and the like or parenterally in the form of an injectable solution or suspension. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts such as the hydrobromide, hydrochloride, sulfate, phosphate and the like and the organic acid salts such as the succinate, benzoate, acetate, maleate, p-toluenesulfonate, benzenesulfonate and the like.

For the above-mentioned uses, the dosage administered will, of course, vary depending upon the compound employed and the mode of administration. However, in general, satisfactory results are obtained when administered at a daily dosage of from about 25 milligrams to about 50 milligrams per kilogram of animal body weight, preferably given in divided doses, 2 to 4 times a day, or in sustained release form. For most mammals, the daily dosage is generally in the range of from about 100 milligrams to about 200 milligrams and dosage forms suitable for internal administration comprise from about 25 milligrams to about 100 milligrams of the compound admixed with a solid or liquid pharmaceutical carrier or diluent.

A representative formulation is a tablet (prepared by standard tabletting techniques) and containing the following ingredients:

| Ingredients: | Parts by wt. |
|---|---|
| 7 - (p-chlorophenyl) - 7 - hydroxy - 2,3,4,5-tetrahydro - 7H - [1,3]diazepino[2,1-a]isoindole | 25 |
| Tragacanth | 2 |
| Lactose | 64.5 |
| Corn starch | 5 |
| Talcum | 3 |
| Magnesium stearate | 0.5 |

The following examples show representative compounds encompassed within the scope of this invention and the manner in which such compounds are prepared. However, it is to be understood that the examples are for purposes of illustration only.

EXAMPLE 1

7-(p-chlorophenyl)-7-hydroxy-2,3,4,5-tetrahydro-7H-[1,3]diazepino[2,1-a]isoindole

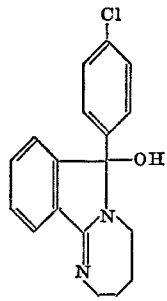

To a flask equipped with a stirrer, gas inlet tube and Soxhlet containing 20 g. (0.064 mole) of 11b-(p-chlorophenyl)-1,2,3,4,5,11b-hexahydro - 7H - [1,3]diazepino-[2,1-a]isoindole-7-one is added 1000 ml. of anhydrous diethyl ether and 6.1 g. (0.16 mole) of lithium aluminium hydride. The system is blanketed with nitrogen and the contents of the flask stirred and refluxed for 48 hours. The flask is cooled in an ice-bath and then treated with 12.1 ml. of 2 N sodium hydroxide and 18.3 ml. of water. The resulting mixture is filtered and the filtrate concentrated in vacuo on a rotary evaporator. The residue is crystallized from methylene chloridediethyl ether (2:1) to obtain 7-(p-chlorophenyl)-7-hydroxy-2,3,4,5-tetrahydro-7H-[1,3]diazepino[2,1-a]isoindole, M.P. 237–239° C.

EXAMPLE 2

7-hydroxy-7-phenyl-2,3,4,5-tetrahydro-7H-[1,3-diazepino[2,1-a]isoindole

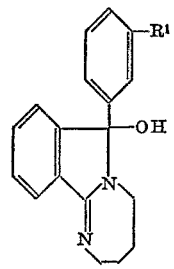

To a flask equipped with a stirrer, condenser and gas inlet tube, and blanketed with nitrogen, is added 500 ml. of diethyl ether, 2.3 g. (0.061 mole) of lithium aluminum hydride and 15.0 g. (0.054 mole of 11b-phenyl-1,2,3,4,5,11b-hexahydro - 7H - [1,3]diazepino[2,1-a]isoindole-7-one. The mixture is stirred at room temperature (20–25° C.) for 8 days, then cooled in an ice-bath and then treated with 5 ml. of 2 N sodium hydroxide and 7.5 ml. of water. The resulting mixture is filtered and the solids extracted twice with 75 ml. (each) of ethyl acetate. The combined filtrate and washes are then concentrated in vacuo on a rotary evaporator. The residue is crystallized from methanol-diethyl ether (2:1) to obtain 7-hydroxy-7-phenyl-2,3,4,5-tetrahydro - 7H - [1,3]diazepino[2,1-a]isoindole, M.P. 216–217° C.

What is claimed is:

1. A compound selected from the group consisting of isoindoles of the formula

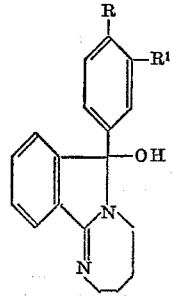

and the non-toxic acid addition salts thereof, wherein each of R and $R^1$ is, independently, hydrogen, chloro, or fluoro.

2. The compound of claim 1 which is 7-hydroxy-7-phenyl-2,3,4,5-tetrahydro - 7H - [1.3]diazepino[2,1-a]isoindole.

3. The compound of claim 1 which is 7-(p-chlorophenyl)-7-hydroxy - 2,3,4,5 - tetrahydro-7H-[1,3]diazepino-[2,1-a]isoindole.

4. A process for preparing a compound of claim 1 in free base form which comprises contacting a compound of the formula

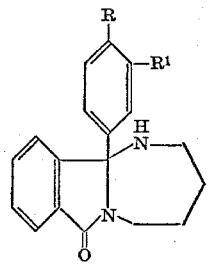

wherein R and $R^1$ are as defined in claim 1, with lithium aluminum hydride in an inert ether solvent and at a temperature not exceeding about 60° C.

5. A process of claim 4 wherein the temperature is in the range of from about 15° C. to about 60° C.

6. A process of claim 4 wherein the temperature is in the range of from about 15° C. to about 35° C.

7. A process of claim 6 wherein the solvent is diethyl ether.

References Cited
UNITED STATES PATENTS 3,379,733   4/1968   Houlihan _____ 260—326.5

ALEX MAZEL, Primary Examiner

B. DENTZ, Assistant Examiner

U.S. Cl. X.R.

424—274